(12) United States Patent
Ivanov

(10) Patent No.: US 12,139,876 B2
(45) Date of Patent: Nov. 12, 2024

(54) COMPACTION MACHINE WITH ELECTRIC WORKING ASSEMBLY

(71) Applicant: Husqvarna AB, Huskvarna (SE)

(72) Inventor: Ivaylo Ivanov, Ruse (BG)

(73) Assignee: HUSQVARNA AB, Huskvarna (SE)

( * ) Notice: Subject to any disclaimer, the term of this patent is extended or adjusted under 35 U.S.C. 154(b) by 101 days.

(21) Appl. No.: 16/707,499

(22) Filed: Dec. 9, 2019

(65) Prior Publication Data

US 2021/0172142 A1    Jun. 10, 2021

(51) Int. Cl.
| E02D 3/074 | (2006.01) |
| E01C 19/38 | (2006.01) |
| H02K 7/06  | (2006.01) |
| E01C 21/00 | (2006.01) |

(52) U.S. Cl.
CPC ............. E02D 3/074 (2013.01); H02K 7/063 (2013.01); *E01C 21/00* (2013.01)

(58) Field of Classification Search
CPC ......... E02D 3/074; E02D 3/046; E01C 19/32; E01C 19/35; E01C 19/38; E01C 21/00; H02K 7/061; H02K 7/063; B06B 1/16
USPC ......... 404/113, 117, 133.05–133.2; 366/116, 366/120
See application file for complete search history.

(56) References Cited

U.S. PATENT DOCUMENTS

| 2,952,193 | A | * | 9/1960 | Converse | ............... E02D 3/074 404/113 |
| 3,883,260 | A |   | 5/1975 | Heckner | |
| 6,382,424 | B1 | * | 5/2002 | Bolton | ...................... B06B 1/16 209/366.5 |
| 6,717,379 | B1 | * | 4/2004 | Andersson | .............. B06B 1/161 318/114 |
| 2004/0025608 | A1 | | 2/2004 | Fervers et al. | |
| 2010/0166499 | A1 | | 7/2010 | Stenzel | |
| 2010/0199774 | A1 | * | 8/2010 | Stenzel | ................... B06B 1/161 73/672 |
| 2011/0097149 | A1 | | 4/2011 | Steffen | |
| 2013/0004237 | A1 | | 1/2013 | Krings et al. | |
| 2013/0251452 | A1 | | 9/2013 | Steffen | |
| 2013/0279980 | A1 | | 10/2013 | Steffen | |
| 2014/0262400 | A1 | | 9/2014 | Berger et al. | |
| 2015/0167259 | A1 | | 6/2015 | Steffen | |

(Continued)

FOREIGN PATENT DOCUMENTS

| CN | 2787713 Y | 6/2006 |
| CN | 107574809 A | 1/2018 |

(Continued)

*Primary Examiner* — Frederick L Lagman
*Assistant Examiner* — Stacy N Lawson
(74) *Attorney, Agent, or Firm* — BURR & FORMAN LLP

(57) ABSTRACT

An example compaction machine is provided that includes a compaction plate and a housing disposed on the top surface of the compaction plate. The compaction machine may also include an imbalance mass disposed within the housing and affixed to an imbalance mass shaft. The compaction machine may further include a first electric motor affixed to the housing and operably coupled to the imbalance mass shaft, and a second electric motor affixed to the housing and operably coupled to the imbalance mass shaft. The first electric motor and the second electric motor may be axially aligned along a shaft axis and affixed to the housing on opposite sides of the housing.

20 Claims, 5 Drawing Sheets

(56) References Cited

U.S. PATENT DOCUMENTS

Figure 1:
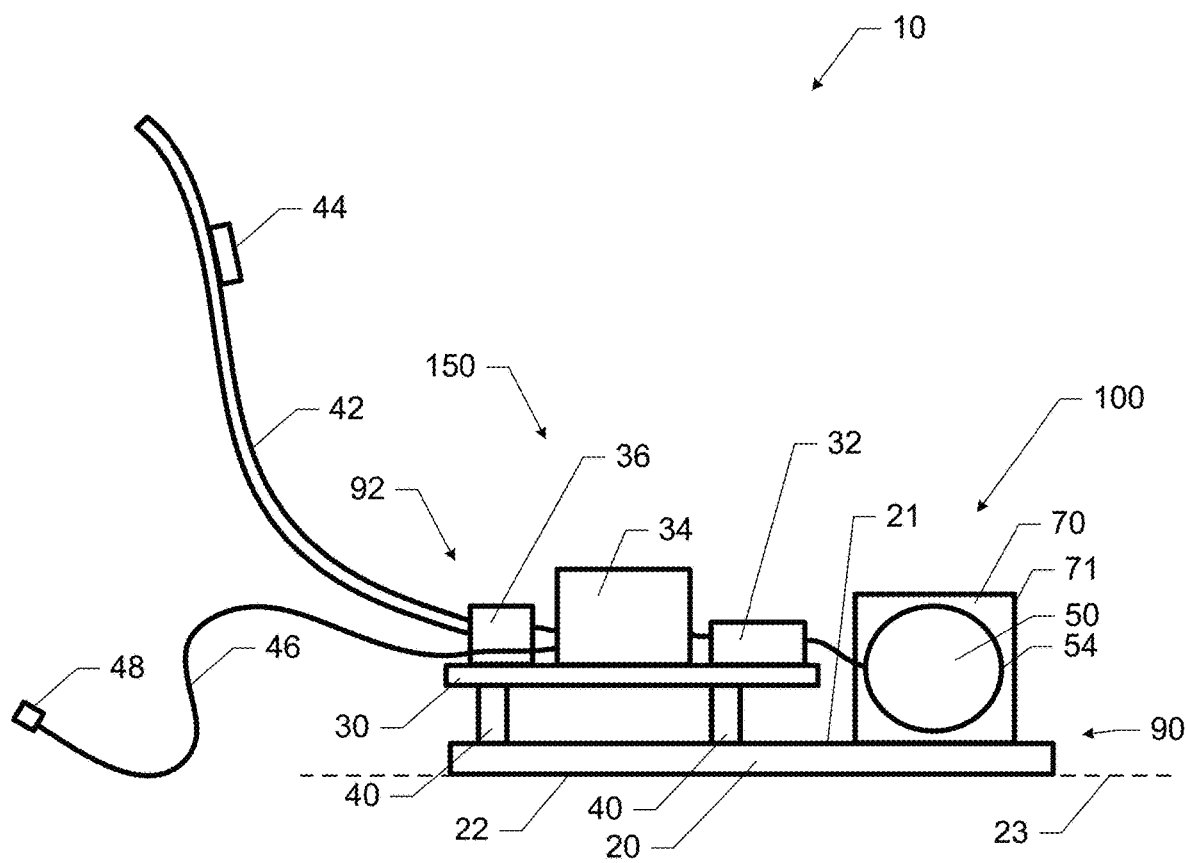

| | | | |
|---|---|---|---|
| 2016/0315511 A1* | 10/2016 | Rivellini | H02K 7/063 |
| 2018/0236490 A1* | 8/2018 | Johnsson | E02D 3/074 |
| 2019/0078282 A1 | 3/2019 | Steffen et al. | |

FOREIGN PATENT DOCUMENTS

| | | |
|---|---|---|
| DE | 1096096 B | 12/1960 |
| DE | 29804993 U1 | 6/1998 |
| DE | 102005029433 A1 | 12/2006 |
| DE | 102009004442 A1 | 7/2010 |
| EP | 1267001 A1 | 12/2002 |
| EP | 3456879 A1 | 3/2019 |
| GB | 2455627 A | 6/2009 |
| JP | 2013181324 A | 9/2013 |
| WO | 2013/107613 A1 | 7/2013 |
| WO | 2018/117048 A1 | 6/2018 |

* cited by examiner

COMPACTION MACHINE WITH ELECTRIC WORKING ASSEMBLY

TECHNICAL FIELD

Example embodiments generally relate to construction power equipment and, more particularly, relate to apparatuses associated with a drive for a compaction machine.

BACKGROUND

Compaction machines are commonly used on construction sites to compact soil or other aggregate (e.g., sand, rock, and the like) to form a solid, level surface that may be used, for example, to support a structural load. Many compaction machines operate by rapidly rotating an eccentric or imbalanced mass to create vibration that is translated to a lower plate that is in contact with the material to be compacted. Conventionally, such an imbalance mass is rotated by an internal combustion engine that generates exhaust and excessive heat. Further, in many implementations, the internal combustion engine must be protected from the vibration generated by the imbalance mass. As such, the internal combustion engine may be required to be seated on a separate, often upper surface, that is mechanically isolated from the imbalance mass and the vibrating plate. Due to this isolation, belts or other coupling mechanisms can be required to drive rotation of the imbalance mass, which adds to the mechanical complexity of the compaction machine and introduces additional maintenance requirements and failure points. As such, there is a need for improvements in the design and implementation of compaction machines that limit or eliminate some of the drawbacks of the conventional compaction machines described above.

BRIEF SUMMARY OF SOME EXAMPLES

According to some example embodiments, an example compaction machine is provided. The example compaction machine may comprise a compaction plate. The compaction plate may comprise a top surface and a bottom surface. The top surface may be on a side of the compaction plate opposite the bottom surface and the bottom surface may be a compacting surface. Further, the compacting machine may also comprise a housing disposed on the top surface of the compaction plate and an imbalance mass disposed within the housing and affixed to an imbalance mass shaft. The compacting machine may also comprise a first electric motor affixed to the housing and operably coupled to the imbalance mass shaft, and a second electric motor affixed to the housing and operably coupled to the imbalance mass shaft. The first electric motor and the second electric motor may be axially aligned along a shaft axis and affixed to the housing on opposite sides of the housing.

According to some example embodiments, another example compaction machine is provided. In this regard, the compacting machine may comprise a compaction plate and an imbalance mass assembly operably coupled to the compaction plate. In this regard, the imbalance mass assembly may comprise an imbalance mass shaft and an imbalance mass affixed to the imbalance mass shaft. The compacting machine may also comprise a first electric motor comprising a first electric motor shaft that is operably coupled to the imbalance mass shaft at a first end of the imbalance mass shaft, and a second electric motor comprising a second electric motor shaft that is operably coupled to the imbalance mass shaft at a second end of the imbalance mass shaft. The first end of the imbalance mass shaft may be disposed opposite the second end of the imbalance mass shaft.

BRIEF DESCRIPTION OF THE SEVERAL VIEWS OF THE DRAWING(S)

Figure 2:
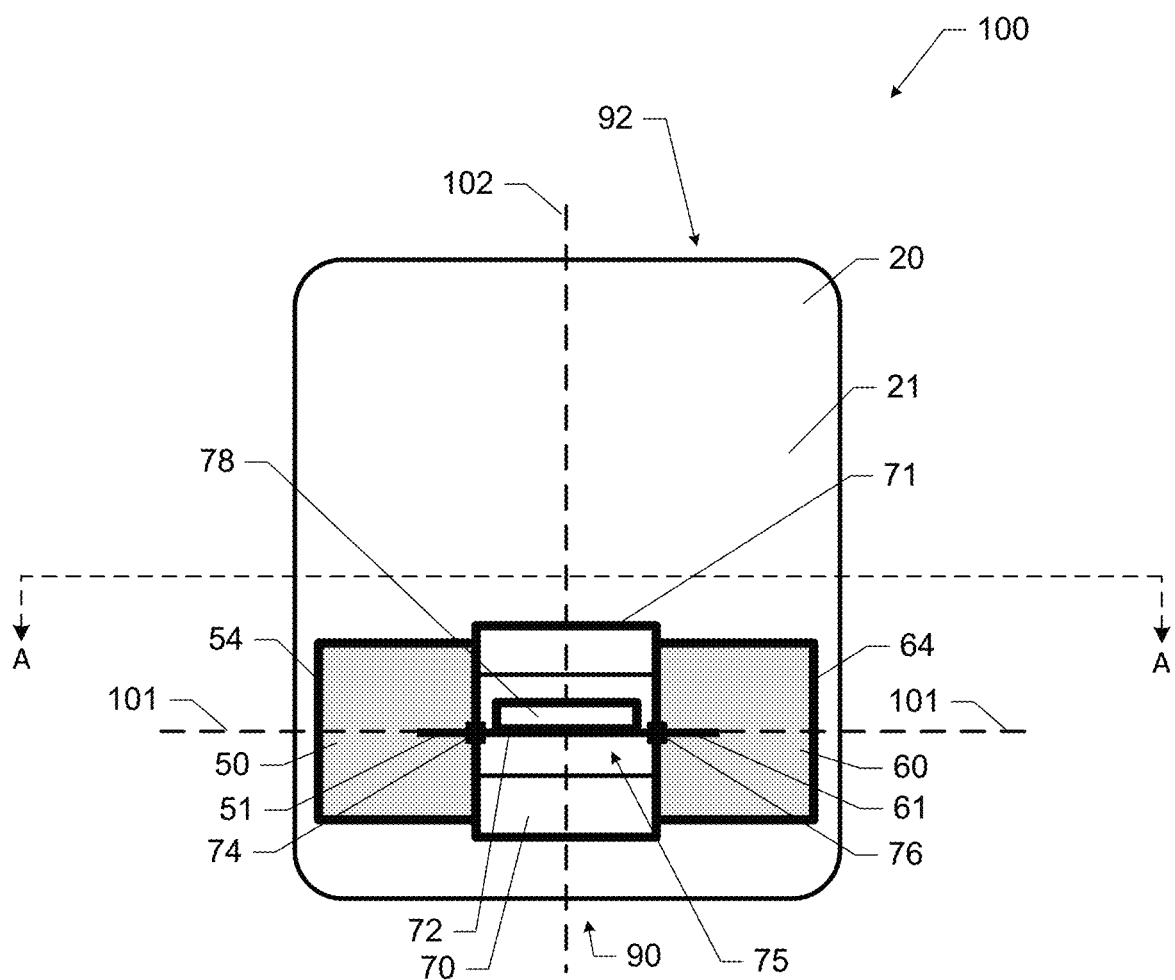
Figure 3:
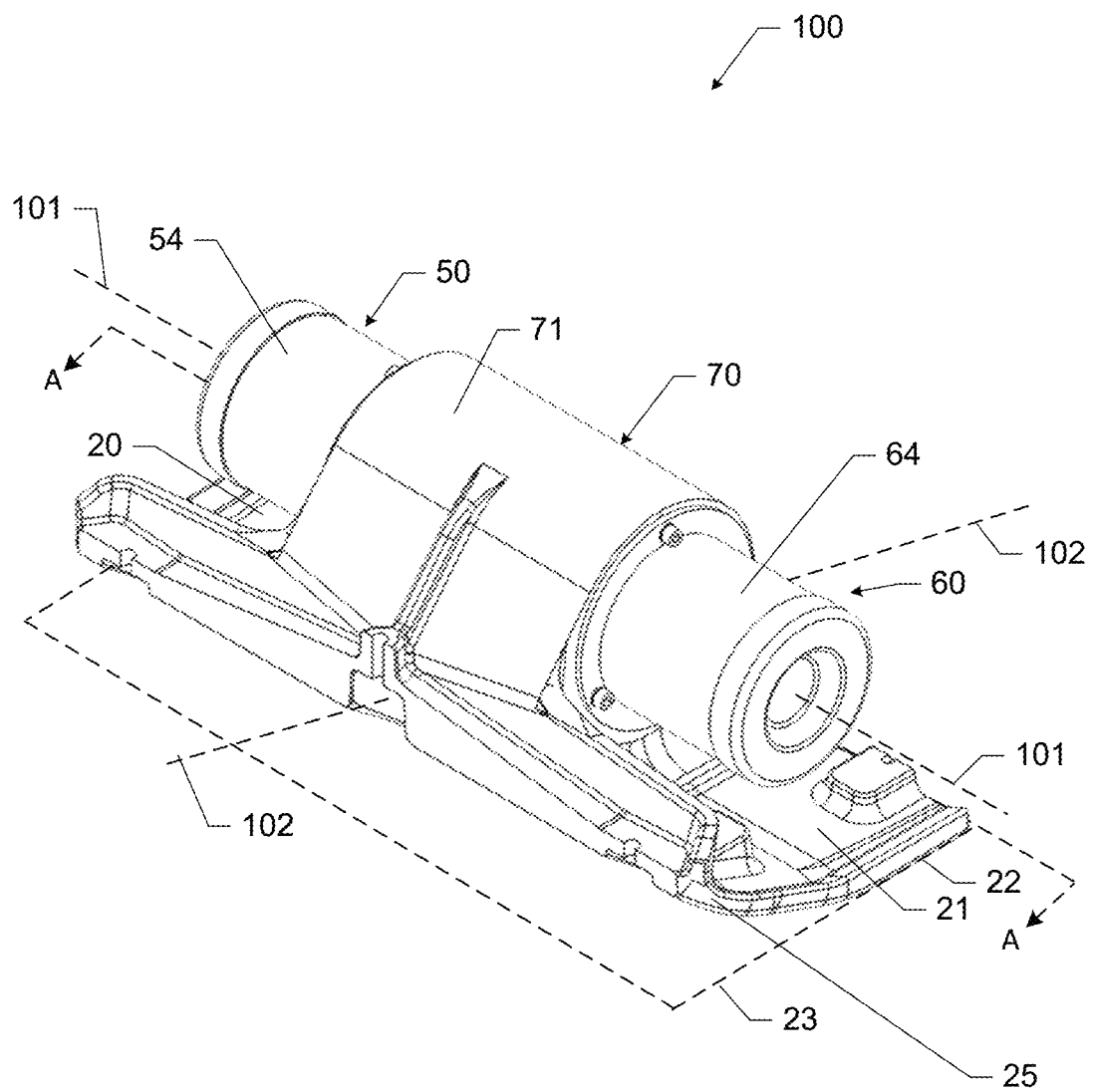
Figure 4:
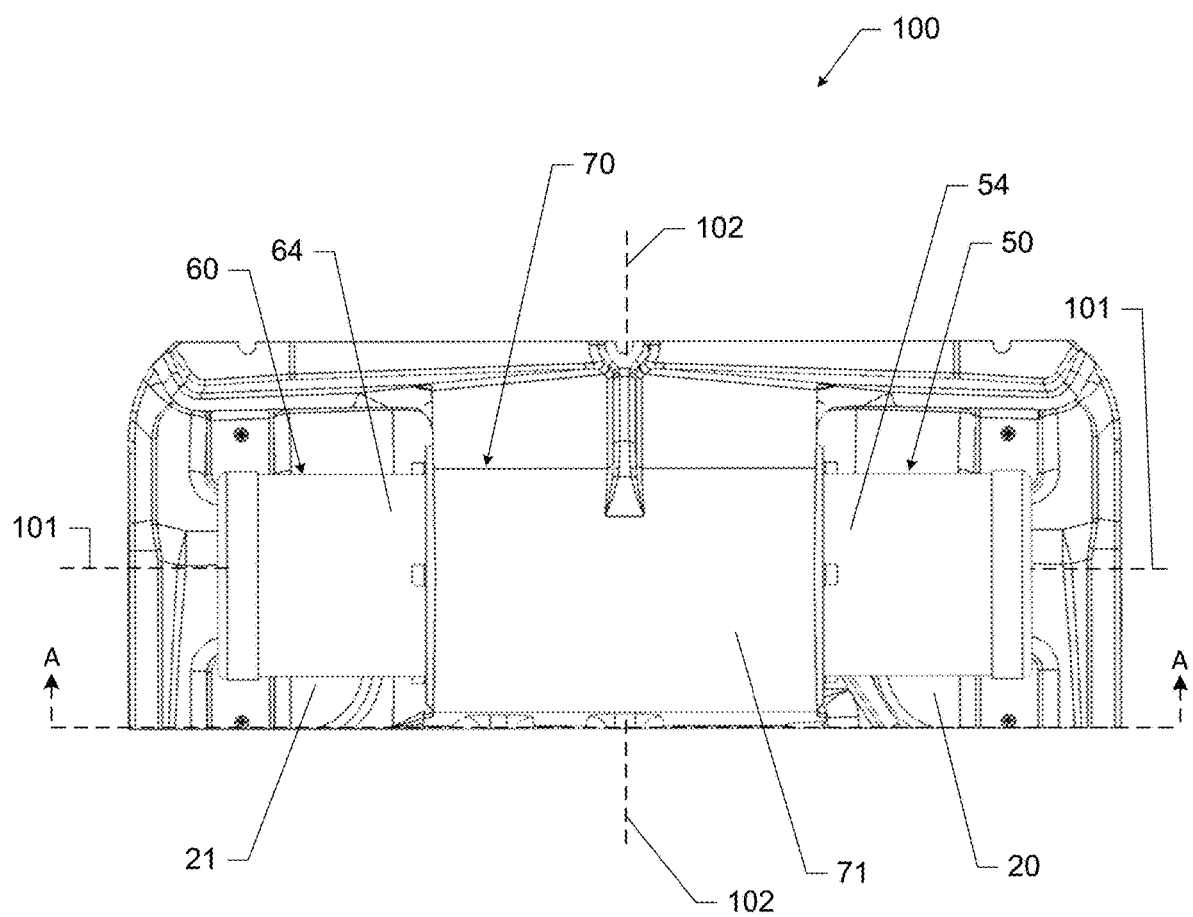
Figure 5:
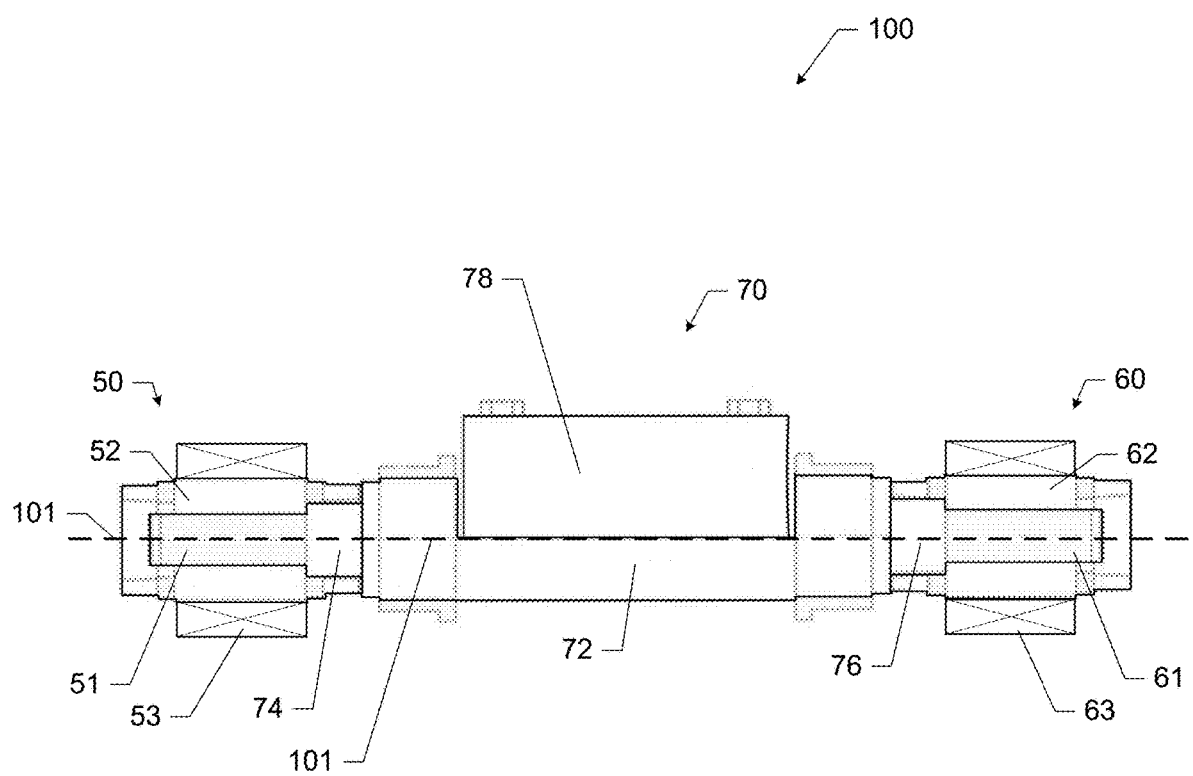

Having thus described some example embodiments in general terms, reference will now be made to the accompanying drawings, which are not necessarily drawn to scale, and wherein:

FIG. 1 illustrates an example compaction machine according to an example embodiment;

FIG. 2 provides a top view of an example working assembly according to an example embodiment;

FIG. 3 provides a perspective front view of a front portion of a working assembly taken at A-A of FIG. 2 according to an example embodiment;

FIG. 4 provides a top view of a front portion of a working assembly taken at A-A of FIG. 2 according to an example embodiment; and FIG. 5 illustrates internal components of a working assembly according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

According to some example embodiments, a compaction machine is provided that utilizes small-sized electric motors to drive an imbalance mass and generate vibration to perform, for example, soil compaction. In this regard, some example embodiments leverage the use of two cooperatively operating electric motors to rotate an imbalance mass disposed between the two electric motors. The electric motors may be mounted or affixed to ends of an imbalance mass housing that may be affixed to or integrated with a compaction plate. According to some example embodiments, the electric motors and a shaft of the imbalance mass may share a common axis of rotation. This axis of rotation for the shafts may be, for example, perpendicular to a longitudinal axis of the compaction plate, where the longitudinal axis of the compaction plate bisects the compaction plate from the front to the rear of the compaction plate.

The use of electric motors on a compaction machine realizes a number of benefits. For example, exhaust fumes are eliminated relative to an internal combustion engine-based solution. Further, heat generation can also be reduced due to use of the electric motors. This can be particularly true when, as mentioned above, two relatively small electric motors are used, which can reduce the heat generation even relative to a solution utilizing a single electric motor to drive an imbalance mass. Additionally, two relatively small electric motors can be used to implement a light-weight compaction machine that can be used, for example, in difficult to access locations or for projects where only "light" compaction is needed. For example, light compaction may be used for compacting soil in preparation for installing a paver walkway or for compacting aggregate prior to pouring cement for a side walk.

In this regard, FIG. 1 illustrates a block diagram side view of an example compacting machine 10, according to some example embodiments. In this regard, the compacting machine 10 may be comprised of a working assembly 100 and a control assembly 150. The control assembly 150 may be configured to control the operation of the working assembly 100 via control circuitry 32 and user inputs via the user interface 44. The working assembly may be configured to generate controlled vibratory motion of a compacting plate 20 to cause, for example, compaction of soil disposed beneath compacting plate 20.

As such, the working assembly 100 may be a portion of the compacting machine 10 that is subjected to high-level vibration and may comprise a compacting plate 20, an imbalance mass assembly 70, a first electric motor 50, and a second electric motor 60 (not shown in FIG. 1, but shown in FIGS. 2-5). As further described below, the first electric motor 50 and the second electric motor 60 may be controlled to drive an imbalance mass within the imbalance mass assembly 70 to cause the compacting plate 20 to vibrate. The vibration of the compacting plate 20 may then be applied by a bottom surface and underlying soil or aggregate to perform a compaction operation. Further, according to some example embodiments, the first electric motor 50 and the second electric motor 60 may be the only electric motors of the compacting machine 10. According to some example embodiments, an imbalance mass of the imbalance mass assembly 70 may be the only imbalance mass of the compacting machine 10.

The compacting plate 20 may be an elongated plate formed of, for example, steel. The compacting plate 20 may be substantially planar and include at least a portion on a bottom surface 22 of the compacting plate 20 that is defined by a surface contacting plane 23. As such, according to some example embodiments, the planar portion of the bottom surface 22 may be the portion of the compacting plate 20 that contacts the soil or aggregate beneath the compacting plate 20 during operation. According to some example embodiments, the bottom surface 22 of the compacting plate 20 may include other features such as rounded or arcuate edges (e.g., an arcuate front edge disposed near a front 90 of the compacting machine 10) to facilitate moving the compacting machine 10 onto loose soil or aggregate areas that require compaction.

A number of components may be operably coupled to a top surface 21 of the compacting plate 20, where the top surface 21 is disposed on a side of the compacting plate 20 that is opposite the bottom surface 22. In this regard, the first electric motor 50, second electric motor 60, and the imbalance mass assembly 70 may be operably coupled to the top surface 21 of the compacting plate 20. According to some example embodiments, a housing 71 of the imbalance mass assembly 70 may be disposed on (e.g., affixed to) the top surface 21 of the compacting plate 20. In this regard, according to some example embodiments, the housing 71 may be integrated (e.g., molded) into the compacting plate 20 such that the compacting plate 20 and the housing 71 are a single unitary component. However, according to some example embodiments, the imbalance mass housing 71 may be comprised of a number of component (e.g., a housing cover and a portion of the compacting plate 20) and the components may be affixed to each other via, for example, welding or fasteners (e.g., bolts and nuts, or the like). An imbalance mass 78 affixed to an imbalance mass shaft 72 may be disposed within the housing 71 and, more specifically, within a channel 75 of FIG. 2, open at both ends, of the imbalance mass housing 71. The first electric motor 50 and the second electric motor 60 may be affixed to the housing 71, for example, at open ends of the imbalance mass housing 71 as further described below. As such, according to some example embodiments, the first electric motor 50 and the second electric motor 60 may be operably coupled to the compacting plate 20 via the imbalance mass housing 71.

According to some example embodiments, the first electric motor 50 and the second electric motor 60 may be identical, but installed on opposite sides of the imbalance mass housing 71. In this regard, the first electric motor 50 and the second electric motor 60 may have the same voltage and the mechanical output ratings. Example electric motors that may be included may, for example, be rated 380 Watts or 600 Watts (or a range there between), and because two motors may be utilized, such wattage may be doubled to indicate the full power rating of the motor system (i.e., 760 Watts and 1200 Watts, respectively). According to some example embodiments, the first electric motor 50 and the second electric motor 60 may be brushless motors, brushless direct current (BLDC) motors, brushed direct current (DC) motors, brushed alternating current (AC) motors, switched reluctance (SR) motors, or asynchronous motors. According to some example embodiments, the first electric motor 50 and the second electric motor 60 may be sized to operate together in collaboration to drive the imbalance mass of the imbalance mass assembly 70. According to some example embodiments, the first electric motor 50 and the second electric motor 60 may be sized such that the first electric motor 50 or the second electric motor 60 alone would not provide sufficient mechanical torque to drive the imbalance mass assembly 70. In this regard, for example, a torque output of the first electric motor 50 may be insufficient to rotate the imbalance mass without contribution from the second electric motor 60. As such, the first electric motor 50 and the second electric motor 60 may be relatively small electric motors that weigh less and generate less heat and other emissions, while still being capable of driving the imbalance mass assembly 70. The first electric motor 50 may comprise a first electric motor housing 54 and the second electric motor 60 may comprise a second electric motor housing 64 (not shown in FIG. 1, but shown in FIGS. 2-4).

As mentioned above, the control assembly 150 may be configured to control the operation of the working assembly 100. Additionally, the control assembly 150 may include more sensitive components that can, but need not be, subjected to high-level vibration. As such, an upper platform 30 of the compacting machine 10, that structurally supports the components of the control assembly 150, may be operatively coupled to the compacting plate 20 via dampening supports 40. The dampening supports 40 may be formed of rubber or spring-based dampening materials to reduce or eliminate the transmission of the vibration generated by the working assembly 100 to the control assembly 150. As such, according to some example embodiments, the dampening supports 40 may be stand-offs that support the upper platform 30 above the compacting plate 20 and dampen the vibrations of the compacting plate 20.

The control assembly 150 may therefore comprise the upper platform 30, control circuitry 32, a power storage device 34, a coupler 36, a steering handle 42, a user interface 44, a power cable 46, and a power plug 48. According to some example embodiments, the control circuitry 32, the power storage device 34, and the coupler 36 may be affixed to the upper platform 30 of the control assembly 150. The coupler 36 may be configured to mechanically affix the steering handle 42 to the upper platform 30 near the rear 92 of the compacting machine 10. The steering handle 42 may be configured to permit a user to grasp the steering handle 42 and control the movement of the compacting machine 10. Because the steering handle 42 is affixed to the upper platform 30, vibration from the working assembly 100 may be reduced in the steering handle 42 by the dampening supports 40. Additionally, according to some example embodiments, the coupler 36 may include additional mechanical dampeners to further reduce vibration traveling to the steering handle 42 and thereby further decreasing the vibration experienced by the user via the steering handle 42.

The control circuitry 32 may be operably coupled, from a mechanical perspective, to the upper platform 30 and may be electrically connected at least to the first electric motor 50 and the second electric motor 60. According to some example embodiments, the control circuitry 32 may also be electrically connected to the power storage device 34, the power cable 46, and the user interface 44.

The control circuitry 32 may, according to some example embodiments, include a processor and a memory that may be configured to support various functionalities of compacting machine 10 and the operation of the working assembly 100 described herein. The control circuitry 32 may also include other passive and active electronic components configured to support the operation of the control circuitry 32 as described herein. In some example embodiments, the processor of the control circuitry 32 may be configured to execute instructions stored in a memory to effectuate the functionality described herein. Alternatively, the processor may be hardware configured as, for example, an application specific integrated circuit (ASIC), a field programmable gate array (FPGA), or the like configured to execute the functionality of the control circuitry 32 as described herein.

In this regard, the control circuitry 32 may be configured to control the operation of the first electric motor 50 and the second electric motor 60. The control circuitry 32 may control the voltage provided to the first electric motor 50 and the second electric motor 60. According to some example embodiments, controlling the voltage to the first electric motor 50 and the second electric motor 60 may be a binary operation that applies a threshold voltage to the first electric motor 50 and the second electric motor 60 when the compacting machine 10 is "on" and does not apply a threshold voltage when the compacting machine 10 is "off." According to some example embodiments, the control circuitry 32 may also be configured to control a speed or rotations per minute (RPM) of the first electric motor 50 and the second electric motor 60. In some example embodiments, the control circuitry 32 may be configured to control the first electric motor 50 and the second electric motor 60 to have a common rotational speed. The speed of the first electric motor 50 and the second electric motor 60 may control a frequency of the vibration generated by the working assembly 100. In this regard, depending on a type of soil or aggregate being compacted, certain frequencies of vibration may be more effective for compaction purposes.

The control circuitry 32 may be connected to the user interface 44, which may comprise one or more user controls such as switches, knobs, or the like. According to some example embodiments, the user interface 44 may be disposed on the steering handle 42 to facilitate convenient interaction by the user. In this regard, the user interface 44 may be configured to receive inputs from a user and convert those inputs into an electrical signal for provision to the control circuitry 32. For example, the user interface 44 may include an on/off switch that, when actuated by the user, causes the first electric motor 50 and the second electric motor 60 to receive or discontinue receiving a voltage. Further, the user interface 44 may include other controls, such as a knob, configured to send a signal to the control circuitry 32 to control a vibration frequency of the working assembly 100. While depicting in FIG. 1 as being disposed on the steering handle 42, the user interface 44 may be disposed, for example, elsewhere on the control assembly 150, such as on the control circuitry 32.

The control circuitry 32 may be configured to operate the first electric motor 50 and the second electric motor 60 identically. In this regard, the signals or voltages that are provided to the first electric motor 50 may be the same or identical signals to the those provided to the second electric motor 60. For example, that control circuitry 32 may be electrically connected to the first electric motor 50 and the second electric motor 60 in parallel. As such, the voltages or signals provided to the first electric motor 50 may be the same as those provide to the second electric motor 60.

According to some example embodiments, electrical power may be supplied to the first electric motor 50 and the second electric motor 60, as well as the control circuitry 32, via the power cable 46. In this regard, the power plug 48 disposed at an end of the power cable 46 may be coupled to mains power to supply power the compacting machine 10. The control assembly 150 may include power regulators and conditioning components configured to supply electrical energy to the first electric motor 50, the second electric motor 60, and the control circuitry 32 in a form that supports the operation of the first electric motor 50, the second electric motor 60, and the control circuitry 32.

The power storage device 34 may be configured to provide portable power to the first electric motor 50 and the second electric motor 60. Additionally, the power storage device 34 may operate as a power source for the control circuitry 32. As such, the first electric motor 50 and the second electric motor 60 may be at least partially powered by the power storage device 34. The power storage device 34 may be a battery sized to store sufficient power to operate the compacting machine 10 for a desirable period of time for a project. The battery may be rechargeable, such as, for example, a lithium-ion or other technology battery. Further, to charge the battery, the control circuitry 32 may be configured to operate as a battery management system to monitor charging and discharging of the battery. The power cable 46, when connected to mains power, may be utilized to provide a charging power source to the battery.

FIG. 2 illustrates a top view of the working assembly 100 with a partial transparent view into some components. In this regard, the compacting plate 20 is shown with the first electric motor 50, second electric motor 60, and the imbalance mass assembly 70. A longitudinal axis 102 is defined along a plane of the compacting plate 20. The longitudinal axis 102 is defined such that the longitudinal axis 102 bisects the compacting plate 20 into two equal portions thereby defining a longitudinal center of the compacting plate 20.

As shown, in FIGS. 1 and 2, the first electric motor 50, second electric motor 60, and imbalance mass assembly 70 may be disposed towards a front 90 of compacting plate 20. According to some example embodiments, the first electric motor 50, second electric motor 60, and imbalance mass assembly 70, when considered as a unit, may be disposed centrally relative to the longitudinal axis 102, such that the longitudinal axis 102 also bisects the imbalance mass assembly 70 and the unit comprising the first electric motor 50, the second electric motor 60, and the imbalance mass assembly 70.

As shown in FIG. 2, the a first electric motor 50 may be affixed to the housing 71 and operably coupled to an imbalance mass shaft 72. Similarly, a second electric motor 60 may be affixed to the housing 71 and operably coupled to the imbalance mass shaft 72. More particularly, the first electric motor 50 may comprise a first electric motor shaft 51 and the second electric motor 60 may comprise a second electric motor shaft 61. Further, the imbalance mass assembly 70 may comprise the imbalance mass shaft 72 coupled to an imbalance mass 78. The first electric motor shaft 51 may be driven to rotate in a selected rotational direction by the first electric motor 50. The second electric motor shaft 61 may be driven to also rotate in the selected rotational direction by the second electric motor 60. The first electric motor shaft 51 may be operably coupled to the imbalance mass shaft 72 at a first end of the imbalance mass shaft 72 via a mechanical coupling 74. The second electric motor shaft 61 may be operably coupled to the imbalance mass shaft 72 at a second, opposite end of the imbalance mass shaft 72 via a mechanical coupling 76.

As such, according to some example embodiments, the first electric motor shaft 51, the second electric motor shaft 61, and the imbalance mass shaft 72 may define a common axis of rotation 101, also referred to as the shaft axis. Further, the first electric motor shaft 51 may be rotationally fixed to the imbalance mass shaft 72 and the second electric motor shaft 61 may also be rotationally fixed to the imbalance mass shaft 72 such that the first electric motor shaft 51, the second electric motor shaft 61, and the imbalance mass shaft 72 rotate together. As such, according to some example embodiments, the first electric motor shaft 51 and the second electric motor shaft 61 may be axially aligned with respect to the axis of rotation 101. Similarly, the first electric motor 50 and the second electric motor 60 may be axially aligned with respect to the axis of rotation 101. Further, the imbalance mass shaft 72 may be axially aligned with the first electric motor shaft 51 and the second electric motor shaft 61 with respect to the axis of rotation 101. The axis of rotation 101 may further be defined as being perpendicular to the longitudinal axis 102 of the compacting plate 20. In other words, the first electric motor shaft 51 and the second electric motor shaft 61 may extend along the axis of rotation 101 transverse to a longitudinal axis 102 of the compaction plate 20. Further, according to some example embodiments, the imbalance mass shaft 72 may also extend perpendicularly to the longitudinal axis 102 of the compaction plate 20. According to some example embodiments, the axis of rotation 101 may be parallel to the plane 23 of the bottom surface 22 (i.e., the soil compacting surface) of the compacting plate 20.

Further, to maintain a center of gravity on the longitudinal axis 102, according to some example embodiments, the imbalance mass assembly 70 may be bilaterally symmetric about the longitudinal axis 102 with respect to structure and with respect to weight distribution. According to some example embodiments, the imbalance mass 78 itself may have bilateral symmetry about the longitudinal axis 102 with respect to weight distribution. According to some example embodiments, when considered as a unit, the first electric motor 50, the second electric motor 60, and the imbalance mass assembly 70 may together have bilateral symmetry about the longitudinal axis 102 with respect to structure and with respect to weight distribution. In this regard, the working assembly 100 may be constructed such that the center of gravity of the working assembly 100 is disposed at a point on the longitudinal axis 102. Further, according to some example embodiments, the center of gravity of the entire compacting machine 10 may be disposed central to the compacting plate 20 because the weight of the upper platform 30 may be disposed toward the rear 92 of the compacting machine 10 and may balance with the weight of the first electric motor 50, the second electric motor 60, and the imbalance mass assembly 70, which may be positioned closer to the front 90 of the compacting machine 10. In some example embodiments, weights may be added to the design of the compacting machine 10 (e.g., weight may be added near the rear 92 of the compacting machine 10) to cause the center of gravity of the compacting machine 10 to be centrally located on the compacting plate 20. A centrally located center of gravity allows for the compacting machine 10 to be more easily maneuverable by the user because the compacting machine 10 should remain relatively stationary while vibrating when the center of gravity is centrally located.

As mentioned above, the imbalance mass housing 71 may have a channel 75 which may be a pass-through opening in the imbalance mass housing 71. The channel 75 may be sized to house the imbalance mass shaft 72 and the imbalance mass 78, and permit the imbalance mass shaft 72 and imbalance mass 78 to rotate within the channel 75. According to some example embodiments, the channel 75 may be cylindrical in shape. In this regard, the axis of rotation 101 may define a central axis through the channel 75.

FIGS. 3 and 4 illustrate a portion of the working assembly 100 taken at A-A of FIG. 2. As shown in FIGS. 3 and 4, the imbalance mass assembly 71 may be integrated with the compacting plate 20. Further, due to the first electric motor 50 being installed on a first side of the imbalance mass housing 71 and the second electric motor 60 being installed on a second side of the imbalance mass housing 71, the openings in the ends of the channel 75 of the imbalance mass housing 71 may be covered by the first electric motor housing 54 and the second electric motor housing 64. As can be seen, the first electric motor housing 54 and the second electric motor housing 64 are axially aligned with the axis of rotation 101.

Further, with particular reference to FIG. 3, a portion of the bottom surface 22 of the compacting plate 20 may define a plane 23 for interacting with soil or aggregate. However, the compacting plate 20 may also include a curved or arcuate front portion 25 that extends out of and above the plane 23. The curved shape of the front portion 25 may facilitate movement or maneuvering of the compacting machine 10 in a forward direction while maintaining the compacting machine 10 on top of or above the soil or aggregate, as opposed to digging into the soil or aggregate.

Now referencing FIG. 5, components of the first electric motor 50, the second electric motor 60, and the imbalance mass assembly 70, of the working assembly 100, that are disposed within the housings of the first electric motor 50, the second electric motor 60, and the imbalance mass assembly 70 are shown. In this regard, for reference, the components are shown relative to the axis of rotation 101 defined in FIGS. 2-4.

Internal components of the first electric motor 50 are shown, which may be housed in the first electric motor housing 54. In this regard, the first electric motor 50 may comprise a motor shaft 51 that may be rotationally driven due to interaction between the motor stator 53 and the motor rotor 52. Further, the motor rotor 52 may be disposed internal to the motor stator 53. The first electric motor shaft 51 may be affixed to the motor rotor 52 to translate the rotation of the motor rotor 52 to the first electric motor shaft 51. Additionally, the first electric motor shaft 51 may be mechanically coupled to the imbalance mass shaft 72 via a coupler 74.

Internal components of the second electric motor 60 are also shown, which may be housed in the second electric motor housing 64. In this regard, the second electric motor 60 may comprise a motor shaft 61 that may be rotationally driven due to interaction between the motor stator 63 and the motor rotor 62. Further, the motor rotor 62 may be disposed internal to the motor stator 63. The second electric motor shaft 61 may be affixed to the motor rotor 62 to translate the rotation of the motor rotor 62 to the second electric motor shaft 61. Additionally, the second electric motor shaft 61 may be mechanically coupled to the imbalance mass shaft 72 via a coupler 76.

As shown in FIG. 5, the imbalance mass assembly 70 may include an imbalance mass 78 affixed to an imbalance mass shaft 72. In this regard, the imbalance mass 78 may be a heavy weight that is affixed to imbalance mass shaft 72 such that the weight distribution about the axis of rotation 101 is non-uniform. As a result of the non-uniform weight distribution, as the imbalance mass shaft 72 rotates, the imbalance mass 78 may create an acceleration and deceleration event each time the imbalance mass 78 performs a revolution due to the effect of gravity on the imbalance mass 78. The acceleration and deceleration events may cause movement in the working assembly 100 thereby creating a vibration for use in compaction. The imbalance mass 78 may be formed of any type of material, such as, for example, iron or steel. According to some example embodiments, first electric motor shaft 51, the second electric motor shaft 61, and the imbalance mass shaft 72 may be affixed to each other or may be formed as a singular, unitary component. In this regard, being mechanically or operably coupled includes the options of being affixed to or integrated with as a singular unitary component. Further, the first electric motor shaft 51, the second electric motor shaft 61, and the imbalance mass shaft 72 may be operably coupled such that these components are rotationally fixed and therefor rotate together. Further, according to some example embodiments, the first electric motor shaft 51, the second electric motor shaft 61, or the imbalance mass shaft 72 may be operably coupled to bearings that facilitate smooth rotation of the shafts. For example, according to some example embodiments, bearings may be disposed on each side of the imbalance mass shaft 72, disposed between the first electric motor 50 and the imbalance mass 78 and between the second electric motor 60 and the imbalance mass 78.

Accordingly, as provided herein, an example compaction machine 10 is provided that may comprise a compaction plate 20. The compaction plate 20 may comprise a top surface 21 and a bottom surface 22. Further, the top surface 21 may be on a side of the compaction plate 20 opposite the bottom surface 22. The bottom surface 22 may be a compacting surface for contacting soil or aggregate to compact. The example compacting machine 10 may also comprise a housing 71 disposed on the top surface 21 of the compaction plate 20. The example compacting machine 10 may also comprise an imbalance mass 78 disposed within the housing 71 and affixed to an imbalance mass shaft 72. The example compacting machine 10 may also comprise a first electric motor 50 affixed to the housing 71 and operably coupled to the imbalance mass shaft 72. The example compacting machine 10 may also comprise a second electric motor 60 affixed to the housing 71 and operably coupled to the imbalance mass shaft 72. The first electric motor 50 and the second electric motor 60 may be axially aligned along a shaft axis (e.g., axis of rotation 101) and affixed to the housing 71 on opposite sides of the housing 71.

According to some example embodiments, the shaft axis (e.g., axis of rotation 101) may be perpendicular to a longitudinal axis 102 of the compacting plate 20. The longitudinal axis 102 of the compacting plate 20 may bisect the compacting plate 20. Additionally or alternatively, the imbalance mass shaft 72 may extend perpendicularly to the longitudinal axis 102 of the compaction plate 20. Additionally or alternatively, the first electric motor 50 may comprise a first electric motor shaft 51 and the second electric motor 60 may comprise a second electric motor shaft 61. The first electric motor shaft 51 and the second electric motor shaft 61 may extend along the shaft axis (e.g., the axis of rotation 101) transverse to the longitudinal axis 102 of the compaction plate 20. Additionally or alternatively, the first electric motor 50 and the second electric motor 60 are controlled by control circuitry 32 to have a common rotational speed. Additionally or alternatively, the first electric motor 50 and the second electric motor 60 may be brushless motors, brushless direct current (BLDC) motors, brushed direct current (DC) motors, brushed alternating current (AC) motors, switched reluctance (SR) motors, or asynchronous motors. Additionally or alternatively, the first electric motor 50 may comprise a first electric motor shaft 51 and the second electric motor 60 may comprise a second electric motor shaft 61. In this regard, the first electric motor shaft 51 may be rotationally fixed to the imbalance mass shaft 72 and the second electric motor shaft 61 is also rotationally fixed to the imbalance mass shaft 72 such that the first electric motor shaft 51, the second electric motor shaft 61, and the imbalance mass shaft 72 rotate together. Additionally or alternatively, the first electric motor 50 and the second electric motor 60 may be the only electric motors of the compaction machine 20 and the imbalance mass 78 may be the only imbalance mass of the compaction machine 10. Additionally or alternatively, the imbalance mass 78 may be bisected by the longitudinal axis 102 of the compaction plate 20. Additionally or alternatively, the housing 71 may be integrated with the compaction plate 20 such that the housing 71 and the compaction plate 20 are a unitary component. Additionally or alternatively, a torque output of the first electric motor 50 may be insufficient to rotate the imbalance mass 78 without contribution from the second electric motor 60. Additionally or alternatively, the example compaction machine 10 may further comprise a power storage device 34, wherein the first electric motor 50 and the second electric motor 60 are at least partially powered by the power storage device 34.

According to some example embodiments, another example compaction machine 10 is provided. The example compacting machine 10 may comprise a compaction plate 20 and an imbalance mass assembly 70 operably coupled to the compaction plate 20. The imbalance mass assembly 70 may comprise an imbalance mass shaft 72 and an imbalance mass 78 affixed to the imbalance mass shaft 72. The example compacting machine 10 may also comprise a first electric motor 50 comprising a first electric motor shaft 51 that is operably coupled to the imbalance mass shaft 72 at a first end of the imbalance mass shaft 72. The example compacting machine 10 may also comprise a second electric motor 60 comprising a second electric motor shaft 61 that is operably coupled to the imbalance mass shaft 72 at a second end of the imbalance mass shaft 72. In this regard, the first end of the imbalance mass shaft 72 may be disposed opposite the second end of the imbalance mass shaft 72.

According to some example embodiments, the compaction plate 20 may define a soil compacting surface (e.g., bottom surface 22), and the soil compacting surface may be defined by a plane 23 of the compaction plate 20. The first electric motor shaft 51 and the second electric motor shaft 61 may rotate about a shaft axis (e.g., axis of rotation 101). In this regard, the shaft axis (e.g., axis of rotation 101) may be disposed parallel to the plane 23 of the compaction plate 20. Additionally or alternatively, the first electric motor shaft 51 and the second electric motor shaft 61 may rotate about a shaft axis (e.g., axis of rotation 101), and the shaft axis (e.g., axis of rotation 101) may be perpendicular to a longitudinal axis 102 of the compacting plate 20. Additionally or alternatively, the first electric motor 50 and the second electric motor 60 may be controlled by control circuitry 32 to have a common rotational speed. Additionally or alternatively, the first electric motor shaft 51 may be rotationally fixed to the imbalance mass shaft 72 and the second electric motor shaft 61 is also rotationally fixed to the imbalance mass shaft 72 such that the first electric motor shaft 51, the second electric motor shaft 61, and the imbalance mass shaft 72 rotate together. Additionally or alternatively, the imbalance mass 78 may be bisected by a longitudinal axis 102 of the compaction plate 20. Additionally or alternatively, the unbalanced mass assembly 70 may comprise a housing 71 that is integrated with the compaction plate 20 such that the housing 71 and the compaction plate 20 are a unitary component. Additionally or alternatively, the example compacting machine 10 may further comprise a power storage device 34. In this regard, the first electric motor 50 and the second electric motor 60 may be at least partially powered by the power storage device 34.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements or functions, it should be appreciated that different combinations of elements or functions may be provided by alternative embodiments without departing from the scope of the appended claims. In this regard, for example, different combinations of elements or functions than those explicitly described above are also contemplated as may be set forth in some of the appended claims. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A compaction machine comprising:
    a compaction plate comprising a top surface and a bottom surface, the top surface being on a side of the compaction plate opposite the bottom surface, the bottom surface being a compacting surface;
    a housing disposed on and in contact with the top surface of the compaction plate such that the housing extends upward from the top surface of the compaction plate;
    an imbalance mass disposed within the housing and affixed to an imbalance mass shaft, the imbalance mass shaft being configured to rotate about a shaft axis within the housing;
    a first electric motor operably coupled to the imbalance mass shaft, wherein the first electric motor is sized to be affixed to an external first side of the housing and protrude away from the housing in a first direction along the shaft axis above the top surface of the compaction plate such that the first electric motor is supported by the housing without contacting the top surface of the compaction plate; and
    a second electric motor operably coupled to the imbalance mass shaft, wherein the second electric motor is sized to be affixed to an external second side of the housing and protrude away from the housing in a second direction along the shaft axis above the top surface of the compaction plate such that the second electric motor is supported by the housing without contacting the top surface of the compaction plate, the first electric motor and the second electric motor being axially aligned along the shaft axis and affixed to the housing on opposite external sides of the housing;
    wherein the compaction plate defines a longitudinal axis that bisects the compaction plate;
    wherein a weight distribution of the imbalance mass, the imbalance mass shaft, the first electric motor, and the second electric motor is positioned to have bilateral symmetry about the longitudinal axis.

2. The compaction machine of claim 1, wherein the shaft axis is perpendicular to the longitudinal axis of the compaction plate.

3. The compaction machine of claim 1, wherein the imbalance mass shaft extends perpendicularly to the longitudinal axis of the compaction plate.

4. The compaction machine of claim 1, wherein the first electric motor comprises a first electric motor shaft and the second electric motor comprises a second electric motor shaft, and wherein the first electric motor shaft and the second electric motor shaft extend along the shaft axis perpendicular to the longitudinal axis.

5. The compaction machine of claim 1, wherein the first electric motor and the second electric motor are controlled by control circuitry to have a common rotational speed.

6. The compaction machine of claim 1, wherein the first electric motor and the second electric motor are brushless motors, brushless direct current (BLDC) motors, brushed direct current (DC) motors, brushed alternating current (AC) motors, switched reluctance (SR) motors, or asynchronous motors.

7. The compaction machine of claim 1 wherein the first electric motor comprises a first electric motor shaft and the second electric motor comprises a second electric motor shaft;
    wherein the first electric motor shaft is rotationally fixed to the imbalance mass shaft and the second electric motor shaft is also rotationally fixed to the imbalance mass shaft such that the first electric motor shaft, the second electric motor shaft, and the imbalance mass shaft rotate together.

8. The compaction machine of claim 1, wherein the first electric motor and the second electric motor are the only electric motors of the compaction machine and the imbalance mass is the only imbalance mass of the compaction machine.

9. The compaction machine of claim 1, wherein the housing is integrated with the compaction plate such that the housing and the compaction plate are a unitary component.

10. The compaction machine of claim 1, wherein a torque output of the first electric motor is insufficient to rotate the imbalance mass in isolation; and
wherein a torque output of the second electric motor is insufficient to rotate the imbalance mass in isolation.

11. The compaction machine of claim 1 further comprising a power storage device, wherein the first electric motor and the second electric motor are at least partially powered by the power storage device.

12. The compaction machine of claim 1 further comprising a steering handle configured to permit a user to control movement of the compaction machine via the steering handle, the steering handle extending from a rear of the compaction machine;
wherein the longitudinal axis bisects the compaction plate from a front of the compaction machine to the rear of the compaction machine.

13. The compaction machine of claim 1 further comprising control circuitry electrically connected to the first electric motor and the second electric motor in parallel to control both the first electric motor and the second electric motor with a same signal from the control circuitry.

14. A compaction machine comprising:
a compaction plate;
an imbalance mass assembly operably coupled to the compaction plate, the imbalance mass assembly comprising an imbalance mass shaft and an imbalance mass affixed to the imbalance mass shaft, the imbalance mass shaft being rotatable about a shaft axis;
a first electric motor comprising a first electric motor shaft that is operably coupled to the imbalance mass shaft at a first end of the imbalance mass shaft; and
a second electric motor comprising a second electric motor shaft that is operably coupled to the imbalance mass shaft at a second end of the imbalance mass shaft, the first end of the imbalance mass shaft being disposed opposite the second end of the imbalance mass shaft;
wherein the compaction plate defines a longitudinal axis that bisects the compaction plate;
wherein a weight distribution of the imbalance mass, the imbalance mass shaft, the first electric motor, and the second electric motor is positioned to have bilateral symmetry about the longitudinal axis;
wherein the compaction machine further comprises a housing disposed on and in contact with the compaction plate such that the housing extends upward from the compaction plate;
wherein the first electric motor is sized to be affixed to a first external side of the housing and protrude away from the housing in a first direction along the shaft axis above the compaction plate such that the first electric motor is supported solely by the housing without contacting the compaction plate;
wherein the second electric motor is sized to be affixed to a second external side of the housing and protrude away from the housing in a second direction along the shaft axis above the compaction plate such that the second electric motor is supported solely by the housing without contacting the compaction plate.

15. The compaction machine of claim 14, wherein the compaction plate defines a soil compacting surface, the soil compacting surface being defined by a plane of the compaction plate; and
wherein the first electric motor shaft and the second electric motor shaft rotate about the shaft axis, the shaft axis being disposed parallel to the plane of the compaction plate.

16. The compaction machine of claim 14, wherein the first electric motor shaft and the second electric motor shaft rotate about the shaft axis, wherein the shaft axis is perpendicular to the longitudinal axis of the compaction plate.

17. The compaction machine of claim 14, wherein the first electric motor and the second electric motor are controlled by control circuitry to have a common rotational speed.

18. The compaction machine of claim 14, wherein the first electric motor shaft is rotationally fixed to the imbalance mass shaft and the second electric motor shaft is also rotationally fixed to the imbalance mass shaft such that the first electric motor shaft, the second electric motor shaft, and the imbalance mass shaft rotate together.

19. The compaction machine of claim 14, wherein the housing is integrated with the compaction plate such that the housing and the compaction plate are a unitary component.

20. The compaction machine of claim 14 further comprising a power storage device, wherein the first electric motor and the second electric motor are at least partially powered by the power storage device.

\* \* \* \* \*